US006970352B2

(12) United States Patent
Record et al.

(10) Patent No.: US 6,970,352 B2
(45) Date of Patent: Nov. 29, 2005

(54) DISK DRIVE BACKPLANE CAPABLE OF SUPPORTING MULTIPLE DISK DRIVE CARRIER DESIGNS

(75) Inventors: Leslie James Record, Round Rock, TX (US); Robert Frank Gontarek, Austin, TX (US)

(73) Assignee: Newisys, Inc., Austin, TX (US)

( * ) Notice: Subject to any disclaimer, the term of this patent is extended or adjusted under 35 U.S.C. 154(b) by 104 days.

(21) Appl. No.: 10/602,453

(22) Filed: Jun. 23, 2003

(65) Prior Publication Data

US 2004/0257760 A1    Dec. 23, 2004

(51) Int. Cl.⁷ ............................................... G06F 1/16
(52) U.S. Cl. ....................................................... 361/685
(58) Field of Search ........................................ 361/685

(56) References Cited

U.S. PATENT DOCUMENTS

| | | | | |
|---|---|---|---|---|
| 5,790,374 A | * | 8/1998 | Wong | .......................... 361/685 |
| 6,167,492 A | | 12/2000 | Keller et al. | ................ 711/154 |
| 6,292,360 B1 | * | 9/2001 | Carteau | ....................... 361/685 |
| 6,385,705 B1 | | 5/2002 | Keller et al. | ................ 711/154 |
| 6,490,661 B1 | | 12/2002 | Keller et al. | ................ 711/150 |
| 6,628,513 B1 | * | 9/2003 | Gallagher et al. | .......... 361/685 |

OTHER PUBLICATIONS

*HyperTransport* ™*I/O Link Specification Revision 1.03*, HyperTransport ™ Consortium, Oct. 10, 2001, Copyright © 2001 HyperTransport Technology Consortium.

* cited by examiner

*Primary Examiner*—Yean-Hsi Chang
(74) *Attorney, Agent, or Firm*—Beyer Weaver & Thomas LLP

(57) ABSTRACT

A disk drive backplane is described which includes a connector for interfacing with a corresponding connector on each of a plurality of carrier types. A plurality of status indicator arrays is provided, each of which corresponds to at least one of the carrier types and is operable to transmit status information. Each of the arrays is positioned to interface with a corresponding status interface on the corresponding carrier type(s). Circuitry is provided which enables one of the status indicator arrays thereby configuring the backplane to interface with a particular one of the carrier types.

14 Claims, 6 Drawing Sheets

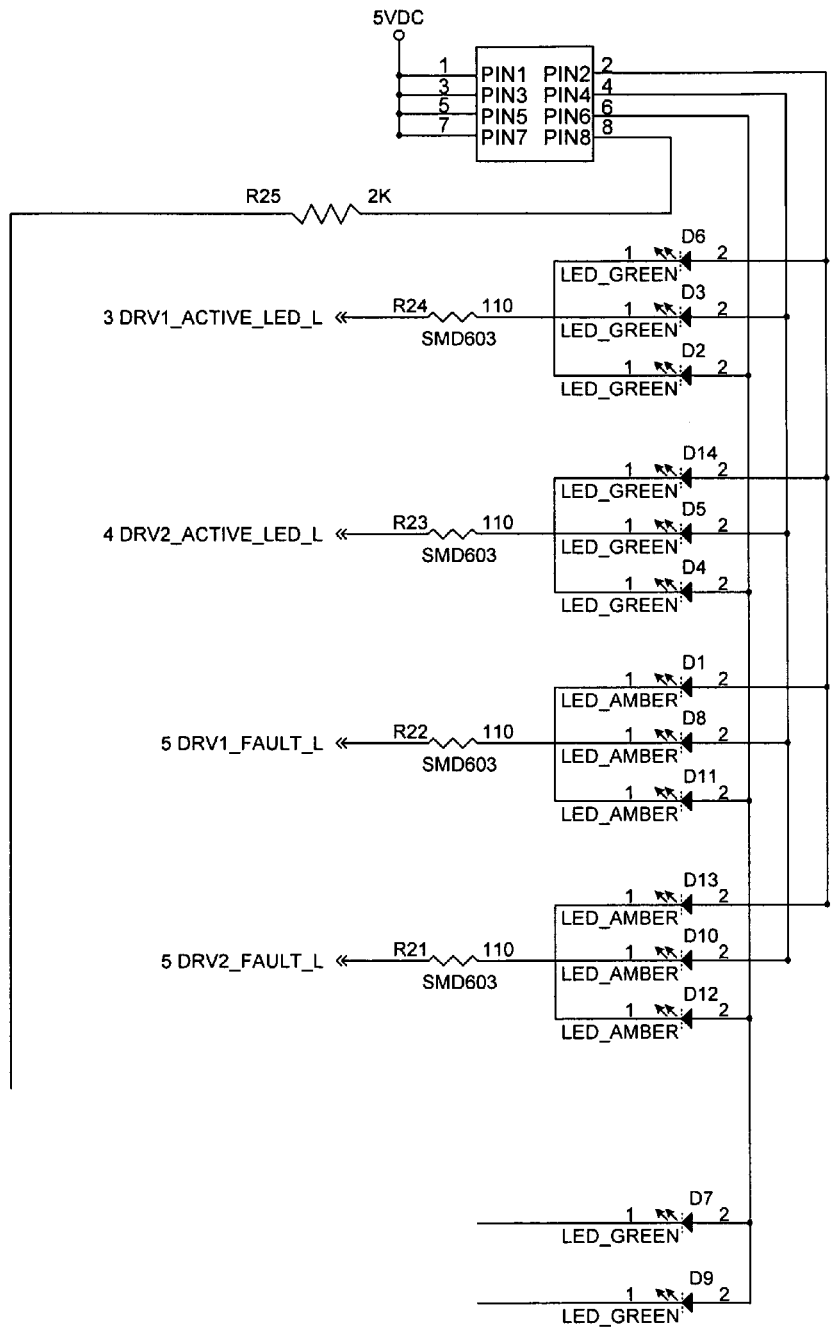
FIG. 5 (part 1)

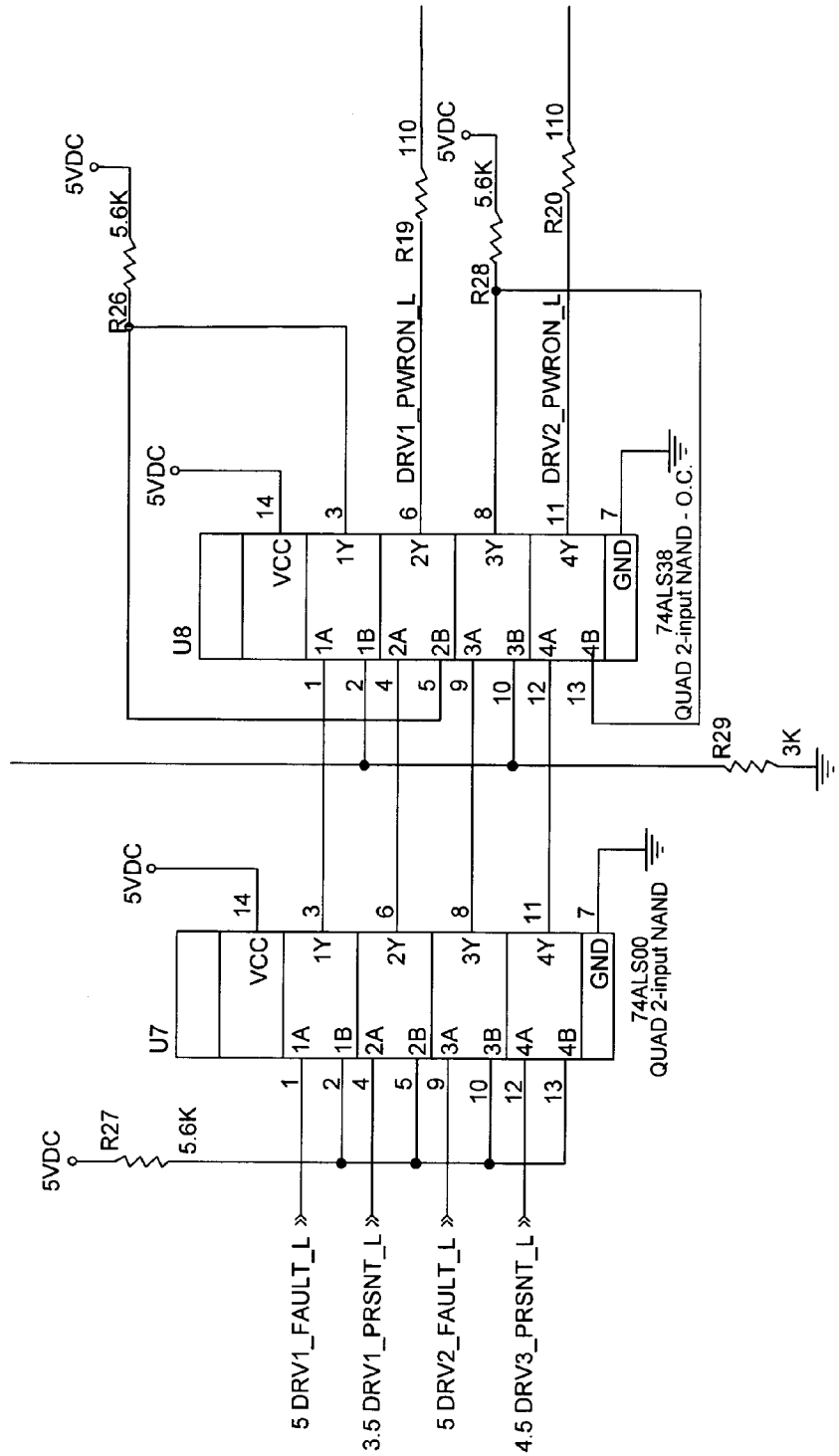
FIG. 5 (part 2)

DISK DRIVE BACKPLANE CAPABLE OF SUPPORTING MULTIPLE DISK DRIVE CARRIER DESIGNS

RELATED APPLICATION DATA

The present application claims priority from U.S. Provisional Patent Application No. for DISK DRIVE BACKPLANE CAPABLE OF SUPPORTING MULTIPLE DISK DRIVE CARRIER DESIGNS filed on May 30, 2003, the entire disclosure of which is incorporated herein by reference for all purposes.

BACKGROUND OF THE INVENTION

The present invention relates to enclosures for housing computer disk drive carriers. More specifically, the present invention provides a backplane for use with such enclosures which can accommodate multiple disk drive carrier designs.

Computer disk drive carriers, particularly those capable of live insertion and removal (i.e., "hot-pluggable" disk drives), are typically installed in carrier frames which provide mechanical support and guidance for the specific drive type. Within such carrier frames, each carrier is latched into place and secured to a backplane which provides the interface to the rest of the computer system. Indicators, e.g., light emitting diodes or light pipe terminations, representing disk drive status and activity are typically provided on the front bezel of such carriers. These indicators are typically controlled by electronics or light sources on the backplane to which the carrier is secured.

As is well known to those familiar with the industry, the variability in the form factors and interface configurations of computer disk drive carriers corresponds roughly to the number of manufacturers providing such devices. This is particularly the case with regard to the manner in which status information is transmitted to the front bezel of the carriers. That is, the nature and position of each carrier's status information interface relative to the backplane vary considerably. As a result, carrier frames are typically constructed with mechanical guides and backplanes which are suitable for only a single carrier type. Not only does this create barriers to using disk drives from different manufacturers, it also represents manufacturing inefficiencies in that a different type of backplane is typically designed and manufactured for each carrier type.

SUMMARY OF THE INVENTION

According to a specific embodiment of the present invention, a disk drive backplane is provided which may be configured to interface with multiple carrier types. According to a specific embodiment, a disk drive backplane includes a connector for interfacing with a corresponding connector on each of the carrier types. A plurality of status indicator arrays is provided, each of which corresponds to at least one of the carrier types and is operable to transmit status information. Each of the arrays is positioned to interface with a corresponding status interface on the corresponding carrier type(s). Circuitry is provided which enables one of the status indicator arrays thereby configuring the backplane to interface with a particular one of the carrier types. According to another specific embodiment, a computer system employing such a backplane is provided.

According to yet another embodiment, a disk drive carrier chassis for use in a computer system is provided. The disk drive carrier chassis is configured to receive each of a plurality of disk drive carrier cages. Each of the disk drive carrier cages is configured to receive a corresponding one of a plurality of different disk drive carrier types.

A further understanding of the nature and advantages of the present invention may be realized by reference to the remaining portions of the specification and the drawings.

BRIEF DESCRIPTION OF THE DRAWINGS

FIG. 5 is a schematic diagram of the logic circuitry for configuring the backplane of FIGS. 3A and 3B to interface with each of the carrier types of FIG. 1.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known features may not have been described in detail in order not to unnecessarily obscure the present invention.

Figure 1:
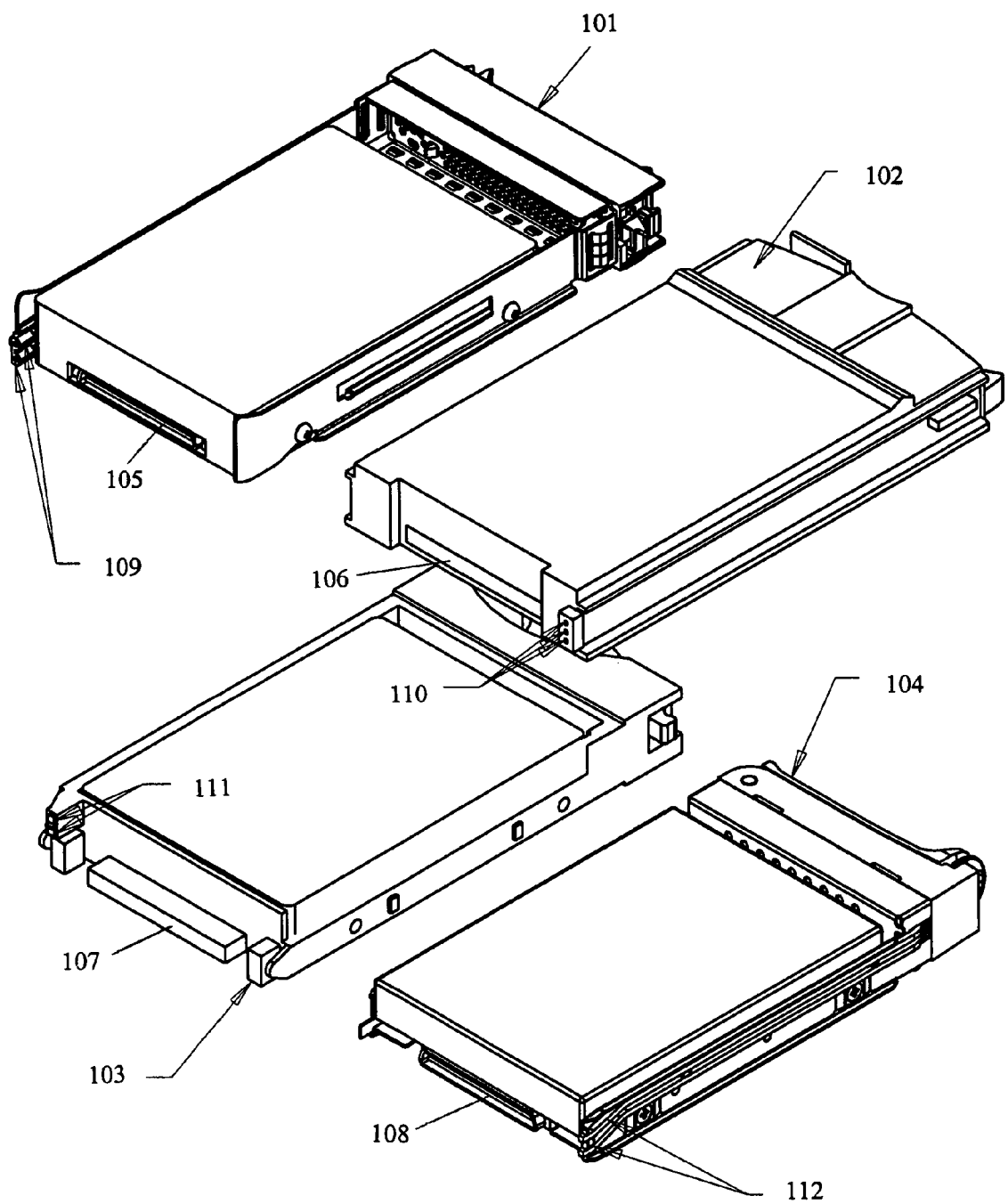
FIG. 1 provides rear perspective views of four different disk drive carrier types.

FIG. 1 provides rear perspective views of four different disk drive carrier types 101–104. According to a specific embodiment, carrier type 101 is provided by Newisys Inc. of Austin, Tex., carrier type 102 is provided by Compaq/Hewlett-Packard, carrier type 103 is provided by International Business Machines (IBM), and carrier type 104 is provided by Dell Computers. As will be understood, the carrier types depicted are presented to illustrate some exemplary dissimilarities among carrier types which may be accommodated according to a specific embodiment of the invention. The invention, however, is not limited to the carrier types depicted.

Each of the carrier types shown in FIG. 1 employs the industry standard SCA-2 connector (105–108) for connection to a backplane (not shown). The specification for the SCA-2 connector is available from the ANSI T-10 Committee for SCSI interfaces, and is incorporated herein by reference for all purposes. As will be understood, other types of connectors are contemplated, and the scope of the invention should not be limited to this type of connector.

Because each of the carriers presents a different form factor, different carrier cages are provided within the carrier chassis in one embodiment of the invention to ensure that the carrier connector for each carrier type is properly aligned with the corresponding connector on the backplane. That is, according to a specific embodiment of the invention, a single chassis is provided which, in conjunction with a number of different removable carrier cages, can accommodate each of the different carrier types.

Figure 2:
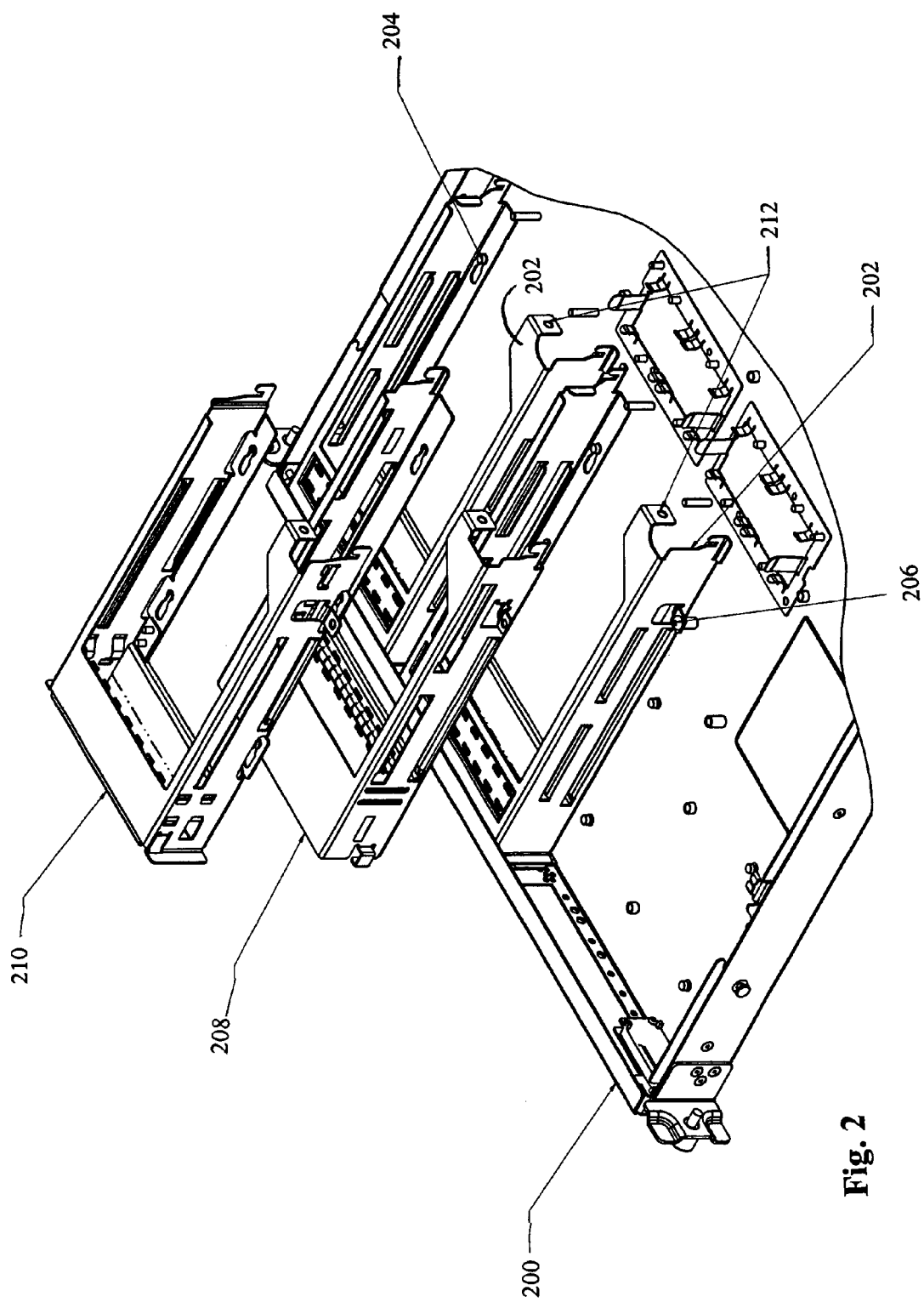
FIG. 2 depicts a mechanical disk drive carrier chassis which may be configured with the carrier cages shown to receive each of the carrier types of FIG. 1.

FIG. 2 depicts a specific embodiment of a mechanical disk drive carrier chassis 200 which may be configured with the carrier cages shown to receive each of the carrier types of FIG. 1. Carrier cages 202, which are shown mounted to chassis 200 via mounting studs and screws (e.g., 204 and 206), are configured to receive carrier types 101 and 103. Carrier cages 208 and 210 which are shown floating above chassis 200 and which may be mounted on chassis 200 in a similar fashion, are configured to receive carrier types 102 and 104 respectively. As shown, each cage is configured to present the same footprint on chassis 200, and to receive at least one of the carrier types so that the connector on the back of the carrier mates with the fixed connector on the backplane (not shown). The backplane of the present invention may be conveniently mounted to the installed carrier cages via mounting holes 212 and their associated mounting surfaces. Thus, a single chassis may be converted to accommodate a variety of carrier types. According to some embodiments, different carrier cages (and thus different carrier types) may be simultaneously mounted within the same chassis.

Referring once again to FIG. 1, each carrier also employs one or more light pipes 109–112 which interface with LEDs on the backplane for the purpose of transmitting status indicator signals to the front of the carrier. These status indicators typically indicate, for example, whether power is on, whether the disk drive is running, faults, etc. The carriers may have different numbers of such light pipes which may also be located at different positions on the back of each carrier. Thus, to have a single backplane which accommodates the different carrier types, this variation in light pipe positions must be accommodated.

Figure 3A:
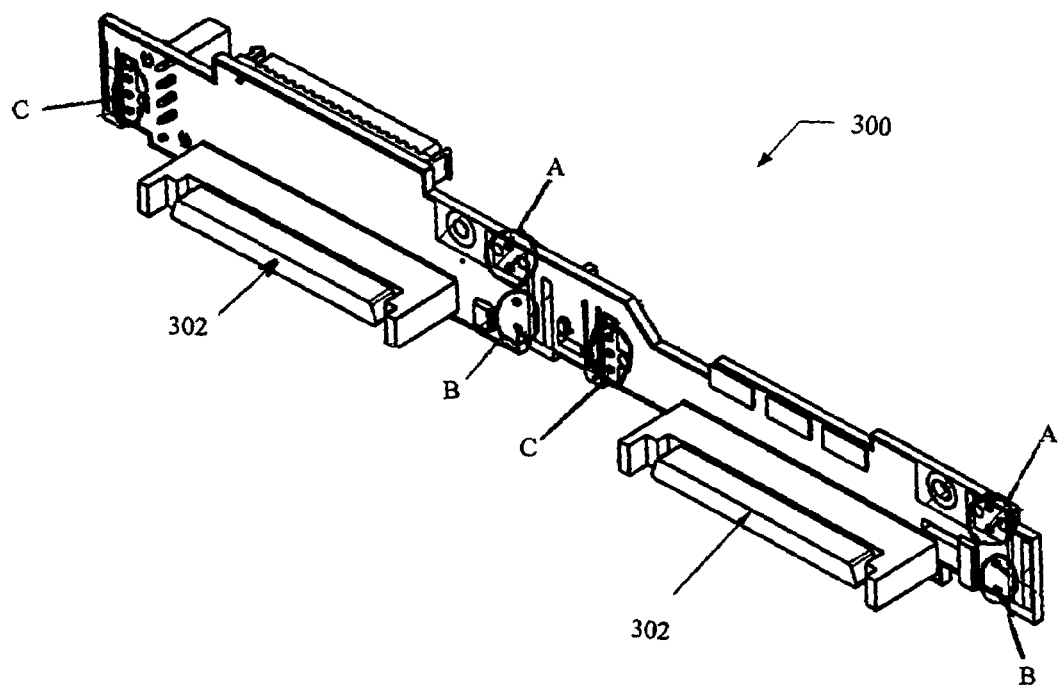
FIGS. 3A and 3B are perspective views of both sides of a disk drive backplane designed according to a specific embodiment of the invention.
Figure 3B:
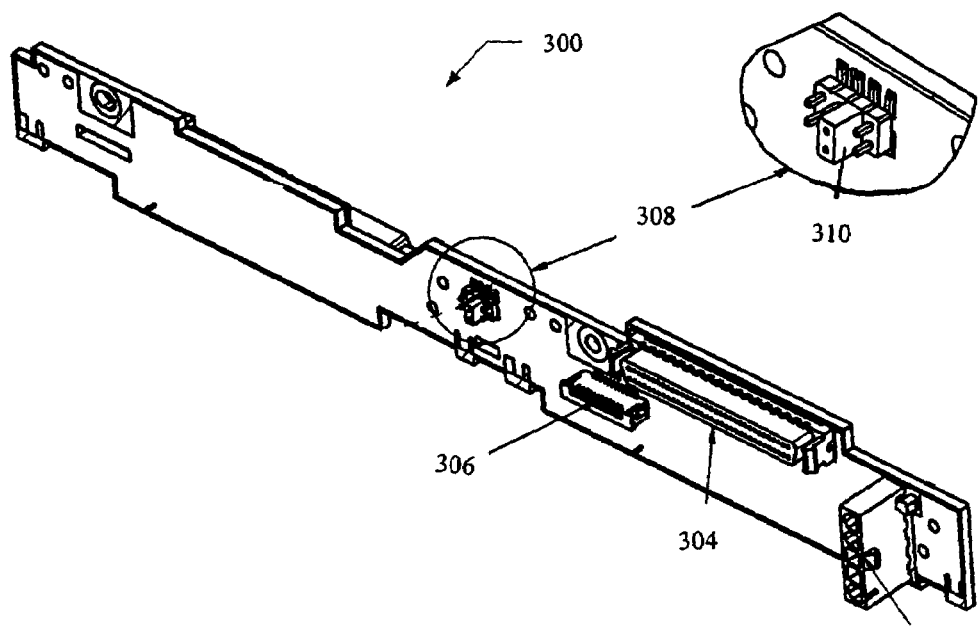

Therefore, according to a specific embodiment of the present invention, a backplane is provided which includes multiple sets or arrays of LEDs, each of which is configured to interface with the light pipes in at least one of the carrier types. FIGS. 3A and 3B are perspective views of both sides of a disk drive backplane designed according to a specific embodiment of the invention. As shown, backplane 300 may interface with two carriers and therefore has some redundancy in the features which are discussed below.

As shown in FIG. 3A, the front of backplane 300 has two connectors 302 which, as described above, may comprise the industry standard SCA-2 connector for connection to the corresponding connectors on the carriers. Associated with each connector 302 are three LED arrays A, B, and C, each of which corresponds to at least one carrier type. In the specific embodiment shown, each of LED arrays A and B has one amber LED and one green LED. Each of LED arrays C has one amber LED and two green LEDs.

As shown in FIG. 3B, the back of backplane 300 has two system connectors 304 and 306. In the particular implementation shown, connector 304 is configured to carry standard SCSI signals to facilitate connector to any controller. Connector 306 may carry any of a variety of additional signals specific to the particular application. In any case, the nature and number of such additional connectors may vary considerably within the scope of the present invention depending on the requirements of the particular implementation.

Backplane 300 also includes an 8-pin jumper block 308 upon which one or more shunts 310 may be installed to configure backplane 300 for interfacing with a particular carrier type. The manner in which this configuration may be effected according to a specific embodiment of the invention will be described in greater detail below with reference to FIG. 5.

According to a specific embodiment, additional light pipe adapters are provided to account for minor variations in front-to-back depth of the carriers as well as light pipe interface positioning to allow multiple carriers to use the same set of LEDs. According to a more specific embodiment, these adapters may be rigid acrylic structures which mount directly to the backplane to facilitate fine alignment to corresponding light pipe interfaces on various ones of the carriers. According to an even more specific embodiment, a light pipe adapter is provided which combines the inputs from multiples LEDs such that the status information represented by the multiple LEDs may be represented on the front of the carrier by a single light. In one embodiment, the LEDs combined in this fashion are of different colors. According to other embodiments, light pipe adapters may be provided which provides the input(s) from a fewer to a greater number of indicators.

Figure 4A:
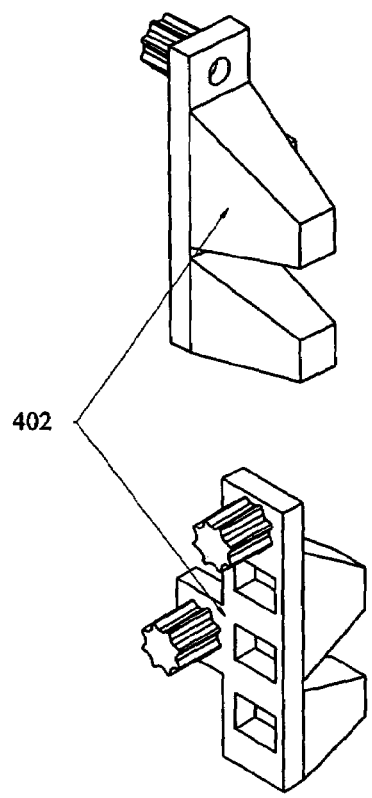
FIGS. 4A and 4B depict light pipe structures for facilitating interfacing of the backplane of FIGS. 3A and 3B with the carrier types of FIG. 1.
Figure 4B:
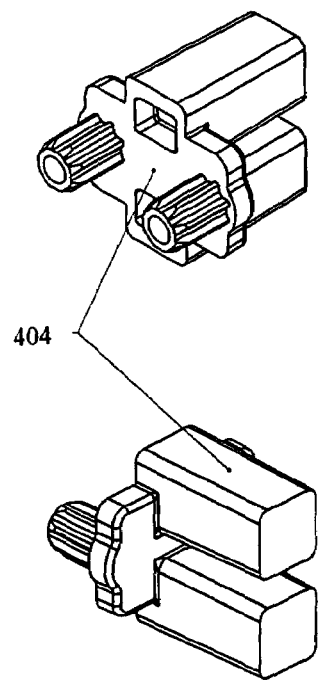

FIGS. 4A and 4B depict some exemplary light pipe structures for facilitating interfacing of the backplane of FIGS. 3A and 3B with the carrier types of FIG. 1. More specifically, light pipe structure 402 of FIG. 4A may be mounted on backplane 300 in communication with the LEDs of array C to facilitate interfacing with carrier type 104. Additionally, light pipe structure 404 of FIG. 4B may be mounted in communication with the LEDs of array A to facilitate interfacing with carrier type 103.

The typical status indicators in the various arrays on a backplane designed according to the invention (which may be LEDs or any of a variety of electrical equivalents) may include a status indicator which indicates the physical presence of a carrier. Another status indicator may represent an activity signal from the carrier itself which is accessed via the connector. Fault indicators may also be provided for those carriers which employ them, and may be driven by fault logic either within or external to the drive carrier.

According to one embodiment, status indicator array A accommodates carriers from IBM (e.g., type 103), status indicator array B accommodates carriers from Newisys Inc. of Austin, Tex. (e.g., type 101), and status indicator array C accommodates carriers from Compaq/Hewlett-Packard (e.g., type 102) and Dell Computers (e.g., type 104). Thus, when the IBM carrier is connected to the connector, its light pipe interface on the back of the carrier aligns with the LEDs of array A (e.g., with the help of structure 404 of FIG. 4B). Similarly, when the Newisys carrier is connected the connector, its light pipe interface aligns with the LEDs of array B.

The positioning of the light pipe interfaces of the Dell and Compaq/H-P carriers is sufficiently similar to warrant a single array C. However, there are differences which need to be accounted for. Therefore, according to a specific embodiment and as discussed above, a light pipe adapter (e.g., structure 402 of FIG. 4A) is provided to allow both carriers to use the same array of LEDs. More specifically, when the Compaq/H-P carrier is connected to the connector, its light pipe interface aligns with the LEDs of array C. However, when the Dell carrier is connected to the connector, an intermediate light pipe adapter is provided between array C and the light pipe interface of the Dell carrier. The adapter accommodates physical variations between the two types of carriers corresponding to array C. These physical variations may correspond to variations in the placement of the light pipe interfaces of the two carriers in the plane of the carrier back panels. According to some embodiments, the variations may also correspond to front-to-back variations of the back panels themselves.

According to a specific embodiment of the invention, an intermediate light pipe adapter (e.g., structure 404) is provided for array A because the back panel of the corresponding carrier provided by IBM is too far away from the backplane to allow for the reliable transmission of light from the LEDs in array A.

As discussed above, and according to one embodiment, array C comprises three LEDs, the Compaq/H-P carrier comprises three corresponding light pipes, and the Dell carrier comprises two light pipes. In this embodiment, the input from the three LEDs in array C are combined (e.g., by structure 402) to provide two outputs to the two light pipes of the Dell carrier. According to a more specific embodiment, different color light from two of the LEDs is provided to one of the light pipes which provides a single indicator on the front of the Dell carrier which represents different states with the two colors.

In general, and according to the invention, a wide variety of mechanisms are contemplated for combining or adapting the status indicators in a single array so that multiple carriers may be supported by that array. That is, additional carriers may be supported using the existing arrays A, B, and C and providing adapter light pipes or circuitry to account for any variations from the current carrier types supported.

According to a specific embodiment, one of the status indicator array types in the backplane is enabled by configuring logic circuitry using, for example, jumper block 308 of FIG. 3B, to gate electrical signals from the carrier (and other system components) to the appropriate indicator array. As will be understood, configuration of the selection logic circuitry may be achieved using a wide variety of mechanisms including, for example, shorting jumpers (e.g., shunt 310) or switches.

According to some embodiments, the selection logic circuitry may be configured to alter the behavior of status indicators, e.g., LEDs, in a given array to accommodate different status meaning as between different carrier types supported by the same array. For example, a Dell carrier has a single indicator which is green for normal operation and yellow when there is a fault. By contrast, array C has both green and yellow LEDS which are combined by the light pipe adapter to interface with the single Dell light pipe. Therefore, when the selection logic circuitry is configured for a Dell carrier, logic is enabled which allows only one of the green and yellow LEDs to be on at the same time. Thus, the behavior of the two LEDs can be made to emulate the behavior of a single, bi-color LED.

FIG. 5 is a schematic diagram of circuitry 500 for configuring the backplane of FIGS. 3A and 3B to interface with each of the carrier types of FIG. 1. This schematic represents an exemplary implementation of a circuit for controlling the light-emitting diodes mounted on the backplane. As mentioned above, the LEDs are grouped into sets according to each carrier type supported. The activation and behavior of the sets of LEDs is influenced by the installation of shorting shunts on jumper block J6 in specific configurations. Once the appropriate shunt is installed, the set of LEDs appropriate to that configuration is activated. Because the backplane for which it was designed (e.g., backplane 300) supports two carriers, circuitry 500 has corresponding redundancies to support both carriers.

The sets of LEDs are distributed on the backplane in such a way as to interface directly or indirectly (e.g., via an intermediate light pipe) to corresponding light pipes on each type of disk drive carrier which are an integral part of the various carriers supported by the implementation. The light pipes carry the visible light emitted by the LEDs to the front of the carrier where the specific information for that indicator is conveyed to the user. The exemplary logic circuitry of FIG. 5 provides for support of four different disk drive carriers.

According to this implementation, the LED indicators to be controlled for each disk drive include a green command activity indicator which illuminates whenever a disk drive is processing a command; an amber fault indicator which is illuminated whenever the system detects an operational fault on the disk drive; and a green power-on indicator which illuminates when the disk drive is seated and has power applied.

For the set of drive carriers supported by this implementation, two carrier types have only two indicators, another has three individual indicators, and a fourth has two indicators, one of which behaves differently depending on the presence or absence of a fault condition. The following lists the four types of carriers and their required indications, together with the LED reference designators in the schematic that correspond to that carrier type.

Type 103 has two indicators: command activity (D6 and D14) and drive fault (D1 and D13). Type 103 does not have a power-on indicator.

Type 101 has two indicators: command activity (D3 and D5) and drive fault (D8 and D10). Type 101 does not have a power-on indicator.

Type 102 has three indicators: command activity (D2 and D4), drive fault (D11 and D12), and power-on (D7 and D9).

Type 104 has three indicators: command activity (D2 and D4), drive fault (D11 and D12), and power-on (D7 and D9).

According to a more specific implementation, carrier type 104 interfaces to the same LED positions as carrier type 102, but differs from type 102 in that it utilizes one light pipe for two indications: green for power-on and amber for a drive fault. As described above, this requirement is addressed in this implementation by interposing an intermediate light pipe that combines the output of the fault and power-on LEDs on the backplane into one light pipe to the carrier. This requires that only one of the amber fault LED and the green power-on LED ever be lit at any specific time. Therefore, according to a specific embodiment, logic is provided to modify the behavior of these LEDs in response to the presence of a fault indication when configured for type 104 carriers.

According to a specific implementation, the LED sets are controlled as follows. A shunt installed between pins 1 and 2 of jumper block J6 only activates D6, D14, D1 and D13 for type 103 carriers. All other LEDs are deactivated.

A shunt installed between pins 3 and 4 only activates D3, D5, D8 and D10 for type 101 carriers. All other LEDs are deactivated.

A shunt installed between pins 5 and 6 only activates D2, D4, D11, D12, D7 and D9 for type 102 carriers. All other LEDs are deactivated.

A first shunt installed between pins 5 and 6 and another shunt installed between pins 7 and 8 activate D2, D4, D11, D12, D7 and D9 for type 104 carriers. In addition, the behavior of D7 is modified such that it turns off when D11 turns on. The behavior of D9 is also modified such that it turns off when D12 turns on thus implementing the aforementioned indicator restriction for type 104 drive carriers. According to a specific embodiment, the behavior is controlled according to the relationship DRVx_PWRON_L=

DRVx_PRSNT+(DRVx_FAULT)(TYPE_FAULT)
(TYPE_4_OPTION) for index x equal to 1 and 2.

While the invention has been particularly shown and described with reference to specific embodiments thereof, it will be understood by those skilled in the art that changes in the form and details of the disclosed embodiments may be made without departing from the spirit or scope of the invention. For example, embodiments have been described with reference to carriers from specific manufacturers and having specific characteristics, e.g., connector type. It will be understood, however, that other types of disk carriers employing a wide variety of connector types may be employed with various embodiments of the invention. In addition, the number and configuration of indicator arrays (e.g., LED arrays), as well as the nature of any intermediate components (e.g., light pipes 402 and 404) required to facilitate interfacing may vary without departing from the invention.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A disk drive backplane for interfacing with a plurality of disk drive carrier types, the backplane comprising:
   a connector for interfacing with a corresponding connector on each of the carrier types;
   a plurality of differently configured status indicator arrays associated with the connector, each of the arrays corresponding to at least one of the carrier types and comprising at least one light source operable to transmit disk drive status information, each of the arrays being positioned to interface with a corresponding status interface on the at least one corresponding carrier type; and
   a light pipe adapter operable to facilitate connection between a first one of the status indicator arrays and the status interface of the corresponding carrier type;
   wherein the first status indicator array comprises a first number of light sources, the light pipe adapter being operable to facilitate transmission of the disk drive status information from the first number of light sources to a second number of status indicators via the status interface of the corresponding carrier type, the first number being different from the second number.

2. The backplane of claim 1 further comprising circuitry for enabling one of the status indicator arrays thereby configuring the backplane to interface with a particular one of the carrier types.

3. The backplane of claim 2 wherein the enabling circuitry comprises selection circuitry operable to gate signals to the one of the status indicator arrays being enabled.

4. The backplane of claim 3 wherein the selection circuitry is operable to employ at least one shorting jumper to effect gating of the signals.

5. The backplane of claim 3 wherein the selection circuitry comprises at least one switch to effect gating of the signals.

6. The backplane of claim 3 wherein the signals comprise any of an activity signal from the particular one of the carrier types, a power signal, a fault signal from the particular one of the carrier types, and a fault signal derived from an external source.

7. The backplane of claim 1 wherein the connector comprises a SCA-2 connector as defined by the ANSI T-10 Committee for SCSI interfaces.

8. The backplane of claim 1 wherein the at least one light source represents any of a drive activity signal, a fault signal, and a power signal.

9. The backplane of claim 1 wherein the first number is greater than the second number.

10. The backplane of claim 1 wherein the first number is fewer than the second number.

11. The backplane of claim 1 wherein at least one of the status indicator arrays corresponds to more than one of the carrier types.

12. The backplane of claim 1 wherein each of the status indicator arrays comprises at least one electrical contact operable to transmit the disk drive status information.

13. The backplane of claim 12 wherein the at least one electrical contact represents any of a drive activity signal, a fault signal, and a power signal.

14. A disk drive backplane for interfacing with two different disk drive carrier types, the backplane comprising:
   a connector for interfacing with a corresponding connector on each of the carrier types;
   a first number of light sources operable to transmit disk drive status information, the light sources being positioned to interface with a corresponding status interface on each of the carrier types; and
   a light pipe adapter operable to facilitate transmission of the disk drive status information from the first number of light sources to a second number of status indicators via the status interface of the corresponding carrier type, wherein the second number is not equal to the first number.

* * * * *

UNITED STATES PATENT AND TRADEMARK OFFICE
CERTIFICATE OF CORRECTION

PATENT NO. : 6,970,352 B2
DATED : November 29, 2005
INVENTOR(S) : Record et al.

It is certified that error appears in the above-identified patent and that said Letters Patent is hereby corrected as shown below:

<u>Title page,</u>
Item [60], insert:
-- [60]     Related U.S. Application Data
Provisional application No. 60/474,859, filed May 30, 2003 --.

<u>Column 1,</u>
Line 8, insert -- 60/474,859 -- after "Application No."

Signed and Sealed this

Eleventh Day of April, 2006

JON W. DUDAS
*Director of the United States Patent and Trademark Office*